US011163851B2

(12) United States Patent
Shi (10) Patent No.: US 11,163,851 B2
(45) Date of Patent: Nov. 2, 2021

(54) METHOD, APPARATUS, COMPUTER DEVICE AND STORAGE MEDIUM OF PAGE DISPLAYING

(71) Applicant: PING AN TECHNOLOGY (SHENZHEN) CO., LTD., Guangdong (CN)

(72) Inventor: Guiling Shi, Guangdong (CN)

(73) Assignee: PING AN TECHNOLOGY (SHENZHEN) CO., LTD., Guangdong (CN)

(*) Notice: Subject to any disclaimer, the term of this patent is extended or adjusted under 35 U.S.C. 154(b) by 572 days.

(21) Appl. No.: 16/097,872

(22) PCT Filed: Nov. 23, 2017

(86) PCT No.: PCT/CN2017/112696
§ 371 (c)(1),
(2) Date: Oct. 31, 2018

(87) PCT Pub. No.: WO2019/085085
PCT Pub. Date: May 9, 2019

(65) Prior Publication Data
US 2021/0256088 A1  Aug. 19, 2021

(30) Foreign Application Priority Data
Nov. 1, 2017  (CN) .......................... 201711059899.4

(51) Int. Cl.
*G06F 17/00* (2019.01)
*G06F 16/958* (2019.01)
(Continued)

(52) U.S. Cl.
CPC ........ *G06F 16/972* (2019.01); *G06F 16/9027* (2019.01); *G06F 16/90348* (2019.01); *G06F 16/9577* (2019.01)

(58) Field of Classification Search
CPC ............ G06F 16/972; G06F 16/90348; G06F 16/9027; G06F 16/9577
(Continued)

(56) References Cited

U.S. PATENT DOCUMENTS 9,665,617 B1* 5/2017 Long ...................... G06F 16/951
9,690,764 B1* 6/2017 Batni ..................... G06F 40/103
(Continued)

FOREIGN PATENT DOCUMENTS

CN  104572043 A  4/2015
CN  106776247 A  5/2017
(Continued)

OTHER PUBLICATIONS

Jun Kong, 'Web Interface Interpretation Using Graph Grammars', IEEE Transactions on Systems, Man, and Cybernetics—Part C: Applications and Reviews, vol. 42, No. 4, Jul. 2012 (Year: 2012).*
(Continued)

*Primary Examiner* — Stephen S Hong
*Assistant Examiner* — Matthew J Ludwig
(74) *Attorney, Agent, or Firm* — Polsinelli PC (57) ABSTRACT

A method of page displaying includes: obtaining page data of a current page of an application; the page data includes a screenshot and view identifiers and view names of a plurality of views; adding the plurality of view identifiers to a plurality of arrays having different levels according to a preset rule; building a multi-fork tree corresponding to the current page of the application using the array; generating hierarchical paths corresponding to the plurality of views according to the multi-fork tree, adding corresponding burial point frames to the corresponding views according to the hierarchical path, and transmitting the screenshot provided
(Continued)

with burial point frames to the preset terminal, so that the preset terminal displays the screenshot with burial point frames.

10 Claims, 6 Drawing Sheets

(51) Int. Cl.
    *G06F 16/901* (2019.01)
    *G06F 16/903* (2019.01)
    *G06F 16/957* (2019.01)

(58) Field of Classification Search
    USPC ......................................................... 715/234
    See application file for complete search history.

(56) References Cited

U.S. PATENT DOCUMENTS

| | | | |
|---|---|---|---|
| 2010/0064208 A1* | 3/2010 | Valtchev | G06F 8/38 715/234 |
| 2011/0307243 A1* | 12/2011 | Miller | G06F 40/131 704/4 |
| 2013/0124684 A1* | 5/2013 | Zheng | G06F 40/221 709/217 |
| 2014/0006984 A1* | 1/2014 | Freedman | G06F 3/04817 715/764 |
| 2014/0047413 A1* | 2/2014 | Sheive | G06F 8/30 717/110 |
| 2014/0365869 A1* | 12/2014 | Warila | H04W 84/12 715/234 |
| 2015/0310124 A1* | 10/2015 | Ben-Aharon | G06F 40/106 715/205 |
| 2017/0220587 A1* | 8/2017 | Srinivasan | G06F 40/154 |
| 2018/0150436 A2* | 5/2018 | Ben-Aharon | G06F 40/186 |

FOREIGN PATENT DOCUMENTS

| | | |
|---|---|---|
| CN | 106844217 A | 6/2017 |
| CN | 106934006 A | 7/2017 |

OTHER PUBLICATIONS

International Search Report dated May 22, 2018 in the parent application PCT/CN2017/112696. 9 pages.

* cited by examiner

METHOD, APPARATUS, COMPUTER DEVICE AND STORAGE MEDIUM OF PAGE DISPLAYING

CROSS REFERENCE TO RELATED APPLICATIONS

This application is a National Phase filing under 35 U.S.C. § 371 of PCT/CN2017/112696 filed on Nov. 23, 2017, and claims priority to Chinese Patent Application No. 2017110598994, entitled "METHOD, APPARATUS, COMPUTER DEVICE AND STORAGE MEDIUM OF PAGE DISPLAYING" filed Nov. 1, 2017. The entire contents of each application are hereby incorporated by reference.

TECHNICAL FIELD

The present disclosure relates to the field of computer technology, and in particular, to a method, an apparatus, a computer device, and a storage medium of page displaying.

BACKGROUND

Setting the burial point in APP (Application) is an important means for many APP developers to collect user behavior data. At present, there are various schemes for setting a burial point in an APP, such as code burial point, visual burial point, and no burial point. In order to implement a visual burial point or no burial point, the terminal needs to upload the screenshot of the APP page and the corresponding page data to the web server. Since the view of the button in the screenshot of the APP page cannot be touched, the web server needs to identify and distinguish the view that can be touched in the screenshot of the APP page, and display the screenshot of the APP page after the difference mark through the web page. This allows APP developers to set burial points on different views of the APP page on the Web page. In a conventional way, the web server distinguishes the view that can be touched from other views by adding a border to the view that can be touched. However, to add a border for different views directly in accordance with the page data uploaded by the terminal, it would be difficult to accurately locate the adding position of the border, and the frame and the view are often misaligned, such that the display effect of the APP page is unfavorable.

SUMMARY

According to various embodiments, a method, an apparatus, a computer device and a storage medium of page displaying are provided.

A method of page displaying including:

obtaining page data of a current page of an application; the page data includes a page screenshot and view identifiers, view names, and hierarchical information of a plurality of views;

adding the plurality of view identifiers to a plurality of arrays according to a preset rule; the plurality of arrays have different levels;

querying a view name corresponding to a view identifier in a highest-level array, and marking the view name corresponding to the view identifier in the highest-level array as a parent node;

querying a view name corresponding to a view identifier in a next highest-level array, and marking the view name corresponding to the view identifier in the next highest-level array as a child node of the parent node according to the hierarchical information between the plurality of views;

regarding the child node as a parent node of a view name corresponding to a view identifier in a next-level array to iterate until a lowest-level array;

generating a multi-fork tree corresponding to the current page of the application using the parent node and the corresponding child node; and generating hierarchical paths respectively corresponding to the plurality of views according to the multi-fork tree, adding a corresponding burial point frame to the respective view at the page screenshot according to the hierarchical paths, and transmitting the page screenshot provided with the burial point frame to a preset terminal, so that the page screenshot provided with the burial point frame is displayed by the preset terminal.

An apparatus of page displaying including:

a data obtaining module configured to obtain page data of a current page of an application; the page data includes a page screenshot and view identifiers, view names, and hierarchical information of a plurality of views;

a multi-fork tree building module configured to add a plurality of view identifiers to a plurality of arrays according to a preset rule; the plurality of arrays have different levels; query a view name corresponding to a view identifier in a highest-level array, mark the view name corresponding to the view identifier in the highest-level array as a parent node; query a view name corresponding to a view identifier in a next highest-level array, and mark the view name corresponding to the view identifier in the next highest-level array as a child node of the parent node according to the hierarchical information between the plurality of views; regard the child node as a parent node of a view name corresponding to a view identifier in a next-level array to iterate until a lowest-level array; and generate a multi-fork tree corresponding to the current page of the application using the parent node and the corresponding child node; and a page displaying module configured to generate hierarchical paths respectively corresponding to the plurality of views according to the multi-fork tree, add a corresponding burial point frame to the respective view at the page screenshot according to the hierarchical paths, and transmit the page screenshot provided with the burial point frame to a preset terminal, so that the page screenshot provided with the burial point frame is displayed by the preset terminal.

A computer device includes one or more processors; and a memory storing computer-readable instructions therein which, when executed by the processor cause the processor to implement steps of a method of page displaying provided in any embodiment according to the present disclosure.

One or more non-transitory storage medium storing computer-readable instructions thereon that, when executed by one or more processors, cause the one or more processors to implement steps of a method of page displaying provided in any embodiment according to the present disclosure.

The details of at least one embodiment of the present disclosure will be presented with reference to the following drawings and description. Other characteristic and advantages of the present disclosure will be more apparent from the specification, drawings and claims.

BRIEF DESCRIPTION OF THE DRAWINGS

To illustrate the technical solutions according to the embodiments of the present disclosure more clearly, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating as opposed to restricting the present disclosure.

It should be understood that the terms "first", "second" and the like, as used herein, may be used to describe various elements, but these elements are not limited by these terms. These terms are only used to distinguish one element from another. For example, a first client may be referred to as a second client, and similarly, a second client may be referred to as a first client, without departing from the scope of the present disclosure. Both the first client and the second client are clients, but they are not the same client.

Figure 1:
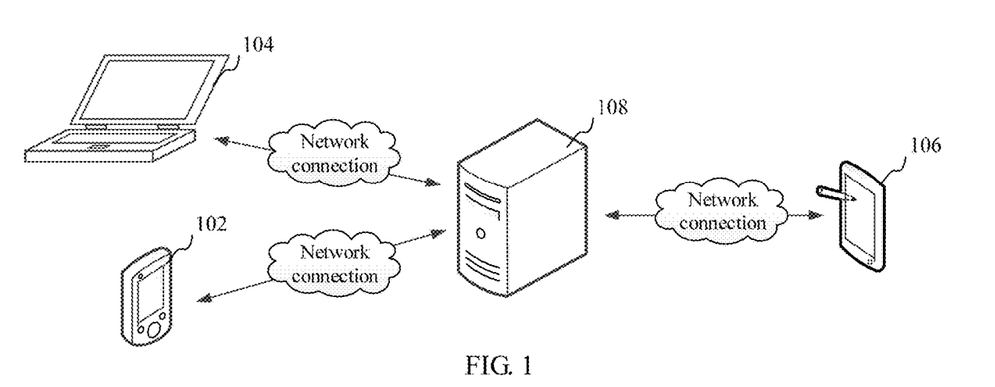
FIG. 1 is a schematic diagram of an application environment of a method of page displaying according to an embodiment.

The method of page displaying provided herein can be applied in an application environment illustrated in FIG. 1. The first terminal 102, the second terminal 104, and the third terminal 106 are respectively connected to the server 108 through a network. The first terminal 102, the second terminal 104, and the third terminal 106 may each be at least one of a smart phone, a tablet computer, a desktop computer, and an in-vehicle computer, but are not limited thereto. The server 108 can be an independent physical server or a cluster of servers composed by a plurality of physical servers. An application that required to set a burial point is run on the first terminal 102 and the third terminal 106 respectively. The first terminal 102 corresponds to an application developer, and the third terminal 106 corresponds to an application user. The first terminal 102 and the third terminal 106 may be the same terminal or different terminals. The application on the first terminal 102 and the third terminal 106 may be a native application (Native APP), a web application (Web APP), or a hybrid application. A plug-in SDK (Software Development Kit) in the application is respectively installed by the first terminal 102 and the third terminal 106. The SDK is a pre-developed script based on the open source UI (User Interface) cross-platform framework. The UI cross-platform framework can be a React Native framework or a Weex framework and the like. The SDK includes data collection scripts, touch event interception scripts, control matching scripts, and touch event reporting scripts for data collection, touch event interception, control matching, and touch event reporting.

When it is necessary to set a burial point for the application, the first terminal 102 obtains page data of the current page of the application using the SDK, and transmits the page data to the server 108. The page data includes view names and hierarchical information of a plurality of views. The server 108 builds a multi-fork tree corresponding to the current page of the application according to the view name and the hierarchical information of the plurality of views, and adds in the page screenshot a burial point frame corresponding to the plurality of views according to the multi-fork tree, and transmits the page screenshot provided with the burial point frame to the second terminal 104, and allows the second terminal 104 to display the current page of the application through the web page. The application developer can circle the control with the burial point frame through the second terminal 104 to set the burial point. The second terminal 104 returns the burial point information corresponding to the buried point control to the server 108. The server 108 returns the burial point information of the buried point control to the server 106. According to the multi-fork tree, the server can obtain the positional relation of each view relative to other views, and can accurately locate the added position of the burial point frame, and has a favorable display effect of the current page of the application.

Figure 2:
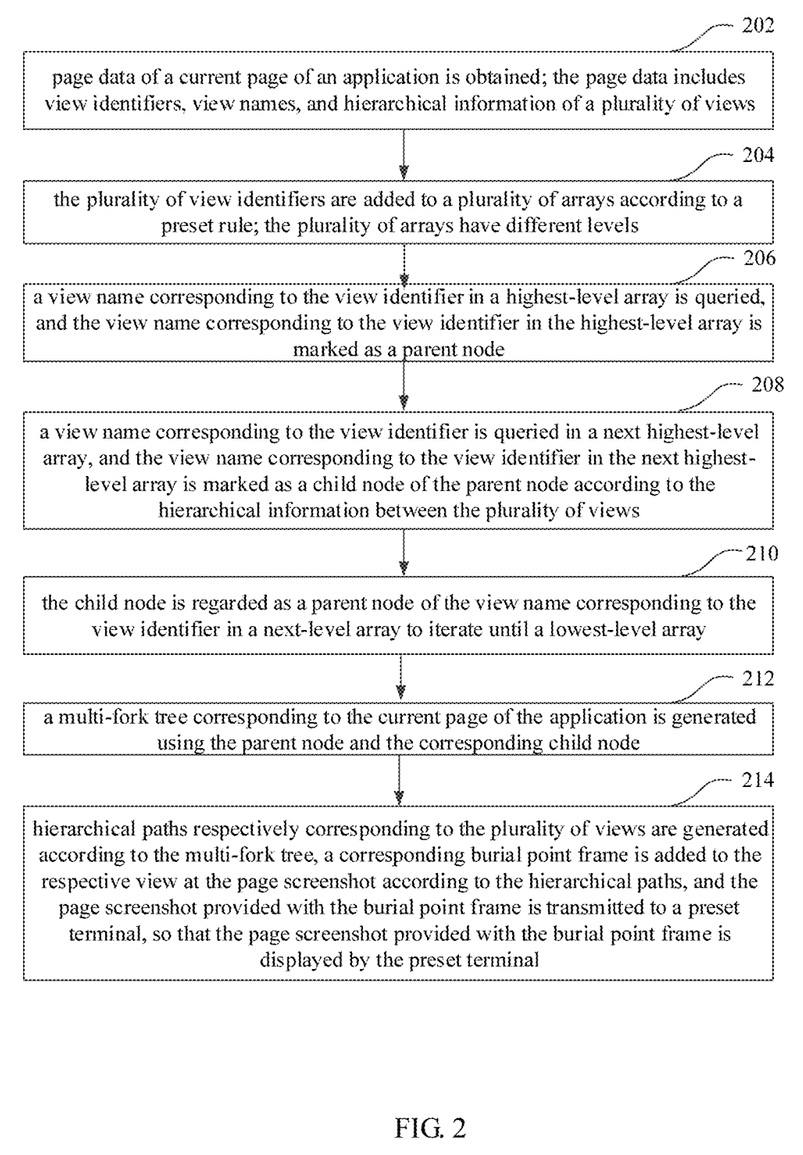
FIG. 2 is a flowchart of a method of page displaying according to an embodiment.

FIG. 2 is a flowchart of a method according to an embodiment of the present disclosure. It should be understood, that although the various steps in the flow chart in FIG. 2 are successively illustrated following the arrows, these steps do not necessarily have to be carried out according to the sequence indicated by the arrows. Unless otherwise described herein, there is no strict sequence restriction of the execution of these steps which can be executed in difference sequences. Also, at least a part of the steps in FIG. 2 can include several sub-steps or several stages that do not necessarily have to be performed at a same time but can be performed at different moments; and they do not necessarily have to be performed successively but can be performed in turn or in alternate with other steps, sub-steps, stages or at least a part thereof.

In one embodiment, as shown in FIG. 2, a method of page displaying is provided, the method is described as being applied in, as an example, the server shown in FIG. 1, which particularly includes the following steps:

In step 202: page data of a current page of an application is obtained; the page data includes view identifiers, view names, and hierarchical information of a plurality of views.

When it is necessary to set a burial point for the application, the first terminal obtains page data of the current page of the application using the SDK. The page data includes a screenshot of the page of the current page of the application and attribute information of the plurality of views within the current page. The screenshot of the page is a static screenshot. The views include controls and view controllers. The current page of the application, used to create and manage controls, is invisible to the user. Users can touch the visible controls. Touch operations include tapping, long press, short press or swipe etc. Attribute information includes view name, view identifier, and tier information. It should be understood that the view name can be the control name or the controller name, and the view identifier can be the control identifier or the controller identifier. The view name can directly reflect the view type. For example, UIWindow (a kind of control name) belongs to the window type control, Mutton belongs to the button type control, and RootViewController belongs to the root view controller etc. The view identifier can uniquely identify a view, which can be a view number such as IDn (n=1, 2 . . . ) etc. Each view has corresponding hierarchical information, and the hierarchical information includes the inheritance relationship between the view and other views. For example, the control UIButton inherits from the control UIView, and the control Mutton is the next hierarchical view of the control UIView.

In step 204: the plurality of view identifiers are added to a plurality of arrays according to a preset rule; the plurality of arrays have different levels.

A highest-level array is established by the server, the view whose view name is the same as the view of the preset root view is queried in the page data, the view identifier of the view with the same view name as the preset root view is extracted, and the extracted view identifier is added to the highest-level array, such as the highest-level array can be A1[ID 6]. The server marks the extracted view as a parent view, and traverses the page data according to the hierarchical information of the parent view to detect whether the child view corresponding to the parent view exists. If there is a corresponding child view in the page data, the server establishes a next highest-level array, extracts the view identifier of the child view corresponding to the parent view in the page data, and adds the extracted view identifier to the next highest-level array, for example, the next highest-level array can be A2[ID 2, ID 7, ID 8]. The server regards the child view as the parent view, and queries in the page data whether the corresponding child view exists. If there is a corresponding child view in the page data, the server establishes a next-level array, extracts the view identifier of the corresponding child view in the page data, and adds the extracted view identifier to the next-level array, for example, the next-level array can be A3 [ID 1, ID 4, ID 5]. The server regards the re-extracted child view as a parent view, and queries in the page data whether a corresponding child view exists. If there is a corresponding child view in the page data, the server creates a further next-level array as described above. This loops until there is no corresponding child view in the page data, and the lowest-level array is obtained. For example, the lowest-level array can be A4[ID3, ID 9, ID10, ID 11, ID 12].

In step 206: a view name corresponding to the view identifier in a highest-level array is queried, and the view name corresponding to the view identifier in the highest-level array is marked as a parent node.

In step 208: a view name corresponding to the view identifier is queried in a next highest-level array, and the view name corresponding to the view identifier in the next highest-level array is marked as a child node of the parent node according to the hierarchical information between the plurality of views.

In step 210: the child node is regarded as a parent node of the view name corresponding to the view identifier in a next-level array to iterate until a lowest-level array.

In step 212: a multi-fork tree corresponding to the current page of the application is generated using the parent node and the corresponding child node.

Figure 3:
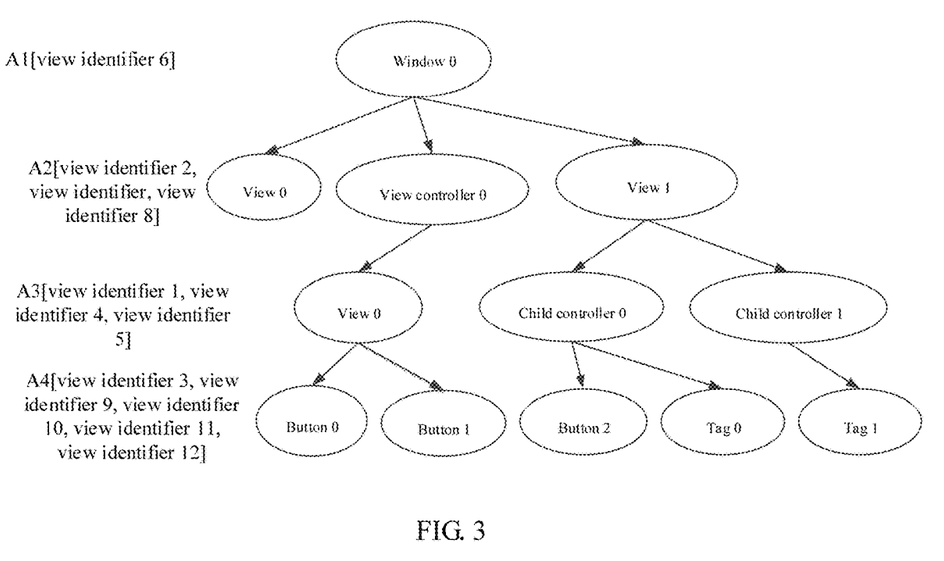
FIG. 3 is a schematic diagram of a multi-fork tree corresponding to a current page of an application according to an embodiment.

It should be noted that step 206, step 208, step 210, and step 212 are performed in parallel with step 204, respectively. In other words, each time the server generates an array, the corresponding array element is added as a node to the multi-fork tree. Specifically, after generating the highest-level array, the server queries a view name corresponding to the array element of the highest-level array, and marks the view name corresponding to the array element of the highest-level array as the root node of the multi-fork tree. For example, as shown in FIG. 3, the root node of the multi-fork tree is the view name. UIWindow corresponding to the array element ID 6 of the highest-level array A1.

After obtaining the root node of the multi-fork tree, the server generates the next-highest-level array according to the foregoing manner, queries a view name corresponding to the array element of the next-highest-level array, and marks the view name corresponding to the array element of the next-highest-level array as the child node of the root node of the multi-fork tree, connects the child node to the root node using a preset connection line to form a plurality of branches of the multi-fork tree. It should be understood that the root node is also the parent node of the foregoing child nodes. For example, as shown in FIG. 3, the preset connection line may be a line segment with an arrow, and the child nodes of the root node are the view names UIView, ViewController, and UIView respectively corresponding to the three array elements ID2, ID7, and ID8 of the next-highest-level array A2, correspondingly forming three branches of the multi-fork tree.

After obtaining the child node of the root node of the multi-fork tree, the server generates the next-level array according to the foregoing manner, and regards the child node as a parent node of the array element in the next-level array, and queries a view name corresponding to the array element of the next-level array, and uses the preset connection line to connect the view name corresponding to the array element in the next-level array to the corresponding parent node to extend the branches of the multi-tree. The server queries the next hierarchical view of the corresponding view of each child node according to the hierarchical information of the corresponding view of each child node, and connects the view name corresponding to the respective array element in the next-level array to the corresponding child node using the preset connection line. For example, as shown in FIG. 3, the next-level array A3 includes three array elements ID1, ID4, and ID5, and the corresponding view names are UIView, ChildController, and ChildController, respectively. Assume that the corresponding view of the array element ID2 of the next highest-level array A2 does not have a next hierarchical view, and the next hierarchical view of the corresponding view of the array element ID7 includes the view corresponding to the array element ID1, and the view name UIView corresponding to the view of the array element ID 1 is connected to the view name ViewController of the view corresponding to array element ID7.

The server sequentially adds the view name of the corresponding view of the array element in each array as a node to the multi-fork tree in accordance with the foregoing manner, and a multi-fork tree corresponding to the current page of the application is formed. The page data uploaded by the first terminal to the server may not have a hierarchical structure after format conversion, and the page data only contains the hierarchical information of a single view, so that the hierarchical relationship between the plurality of views is concealed and scattered, and it is difficult to reflect the application the hierarchical structure between the plurality of views of the current page of the application, as a whole. In this embodiment, the server integrates attribute information of the plurality of views in the application page according to the page data without the hierarchical structure, and extracts a multi-fork tree that can reflect, as a whole, the hierarchical structure between the plurality of views of the current page.

In step 214: hierarchical paths respectively corresponding to the plurality of views are generated according to the multi-fork tree, a corresponding burial point frame is added to the respective view at the page screenshot according to the hierarchical paths, and the page screenshot provided with the burial point frame is transmitted to a preset terminal, so that the page screenshot provided with the burial point frame is displayed by the preset terminal.

During the multi-fork tree construction process, the server numbers each node of the multi-tree so that the view corresponding to each node has a view index. Specifically, the server separately numbers the views corresponding to different hierarchical nodes in the multi-fork tree, and uses the number as the view index of the corresponding view. The server can record the view index as a subscript of the view name of the corresponding view. For example, as shown in FIG. 3, the view indexes corresponding to the three button type views may be UIButton 0, UIButton 1, and UIButton 2.

The server recognizes the view whereby the current page of the application can be touched (hereinafter referred to as "touchable view") according to the attribute information of the view. The server queries a corresponding node in the multi-fork tree according to the view identifier of the touchable view, and marking the node as a target node. The server uses the first preset identifier to sequentially join the view names respectively corresponding to a plurality of nodes from the root node to the target node in the multi-fork tree to obtain a directory string, and regards the directory string as the view path of the view corresponding to the target node. The server uses the second preset identifier to sequentially join the view names respectively corresponding to a plurality of nodes from the root node to the target node in the multi-fork tree to obtain an index string, and regards the index string as the index path of the view corresponding to the target node. The first preset identifier and the second preset identifier may be "/", "_", "#", "s" or "*", etc., respectively.

Figure 4:
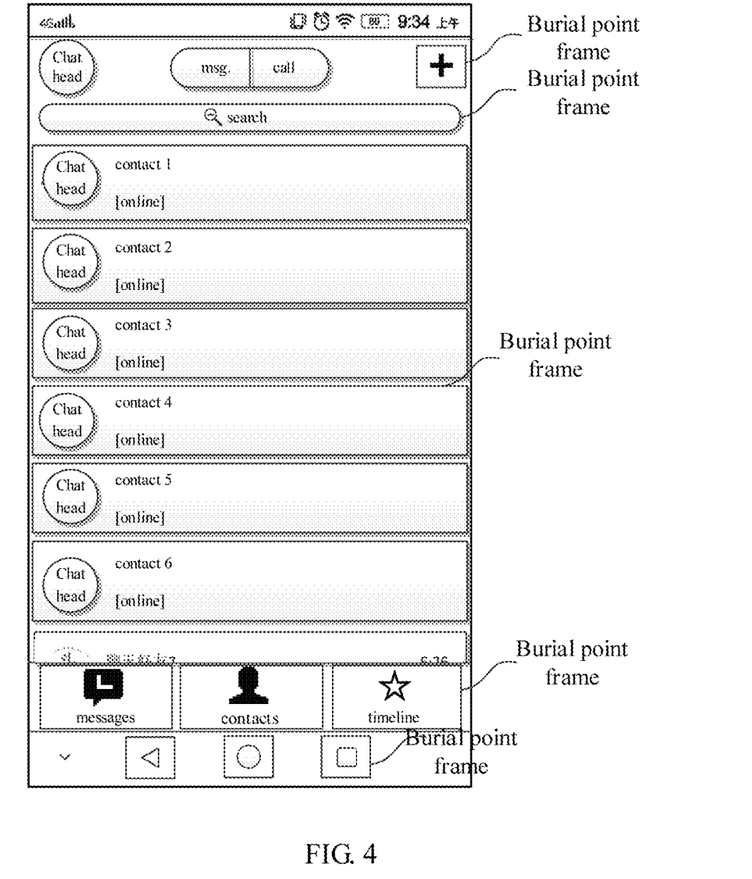
FIG. 4 is a schematic diagram of adding a burial point frame in a page screenshot according to an embodiment.

The server accurately locates each view that can be touched according to the view path and the index path, and adds a corresponding burial point frame to the view that can be touched according to the location. The burial point frames can respond to clicks by application developers. As shown in FIG. 4, the shape and size of the burial point frame may be the same as the shape and size of the icon of the corresponding view. The server transmits a page screenshot provided with the burial point frame to the preset terminal, that is, the second terminal. The second terminal displays a page screenshot provided with the burial point frame. The application developer can implement the burial point setting by clicking on the second terminal the burial point frame on the page screenshot and inputting the corresponding touch event identifier.

In this embodiment, according to the hierarchical information of the plurality of views of the current page of the application, the view identifiers of different views may be added to the plurality of arrays; according to the view identifiers included in the different level arrays, a view name of the corresponding view may be queried; by marking the view name corresponding to the view identifier in the highest-level array as a parent node, and marking the view name corresponding to the view identifier in the next highest-level array as a child node of the parent node, and regarding the child node as a parent node of the view name corresponding to the view identifier in the next-level array to iterate, a multi-fork tree corresponding to the current page of the application is constructed, which can reflect the hierarchical structure of the plurality of views of the current page as a whole. Thereby, the hierarchical path of the view generated by the multi-fork tree can accurately locate each view, so that the burial point frame can be accurately added to the page screenshot to improve the current page display effect of the application.

In an embodiment, the step of adding a plurality of view identifiers to the plurality of arrays according to the preset rule includes: the view identifier corresponding to the view whose view name is the same as the view name of a preset root view in the page data is extracted, the view whose view name is the same as the view name of the preset root view is marked as a parent view, and the extracted view identifier is added to the highest-level array; the page data is traversed according to the hierarchical information between the plurality of views, the view identifier of a child view corresponding to the parent view is extracted in the page data, and the view identifier of the child view is added to the next highest-level array; the child view is regarded as a parent view, the page data whether a corresponding child view exists is queried; when a corresponding child view exists in the page data, the view identifier of the corresponding child view is added to the next-level array, the step of regarding the child view as the parent view, querying in the page data whether a corresponding child view exists is returned to; and when a corresponding child view does not exist in the page data, the lowest-level array is obtained.

The preset root view includes a preset root control and a preset root controller. The parent view includes a parent class control and a parent class controller, and the child view includes a child class control and a child class controller. The child view corresponding to the parent view refers to the next hierarchical view of the parent view. For example, when the control UIButton is the next-hierarchy control of the control UIView, the control UIButton can be understood as a child class control of the control UIView.

The server establishes the highest-level array, extracts the control identifier corresponding to the control whose control name is the same as the control name of the preset root control in the page data, and adds the extracted control identifier to the highest-level array. The default root control can be a UIWindow. The server marks the extracted control as a parent class control, and traverses the page data according to the hierarchical information of the parent class control to detect whether the child class control corresponding to the parent class control exists. When there is a corresponding child class control in the page data, the server establishes a next highest-level array, extracts the control identifier of the child class control (such as child views) corresponding to the parent class control in the page data, and extracts the controller identifier of the view controller whose controller name is the same as the preset root controller, mark the extracted view controller as the parent class controller, and add the control identifier of the extracted child class control and the extracted controller identifier to the next highest-level array. The preset root controller can be rootViewController (a view controller). The server regards the extracted child class control as a parent class control, and queries whether there is a corresponding child class control in the page data, and whether there is a child class controller corresponding to the parent class controller (such as childrenViewController and presentedViewController).

When there is a corresponding child class control in the page data, or a child class controller corresponding to the parent class controller, the server establishes a next-level array, and extracts the control identifier of the corresponding child class control and/or the controller identifier of the child class controller corresponding to the foregoing parent controller, and adds the extracted control identifier and/or controller identifier to the next-level array.

The server regards the re-extracted child class control as a parent class control, regards the extracted parent class controller as a parent class controller, and queries whether there is a corresponding child class control and corresponding child class controller in the page data. When there is a corresponding child class control or corresponding child class controller in the page data, the server creates a further next-level array in accordance with the foregoing manner. This loops until no corresponding child view and no corresponding child class controller exist in the page data, the lowest-level array is obtained.

In this embodiment, the page data uploaded by the first terminal to the server only includes the hierarchical information of a single view, so that the hierarchical relation between the plurality of views is concealed and scattered, and the server integrates the scattered hierarchical information, adds the view to the array of different levels respectively according to the hierarchical information of each view. The level of the array can reflect the hierarchical relation of each view relative to other views, which can improve the building efficiency of the multi-fork tree, and thereby improve the display efficiency of the current page of the application.

In an embodiment, the step of generating hierarchical paths respectively corresponding to the plurality of views according to the multi-fork tree includes: according to the attribute information, the touchable view in the page screenshot is identified; according to the view identifier corresponding to the touchable view, the corresponding node is queried in the multi-fork tree, and the node is marked as the target node; the view name respectively corresponding to the plurality of nodes from the root node to the target node are sequentially joined using the first preset identifier to obtain a directory string, and the directory string is used as the view path of the view corresponding to the target node; the views corresponding to nodes of different hierarchies in the multi-fork tree are separately numbered, the different view types corresponding to nodes of the same hierarchy are separately numbered, and the numbers are regarded as view indexes of the corresponding views; and the second preset identifier is used to sequentially join the view names respectively corresponding to a plurality of nodes from the root node to the target node to obtain an index string, the index string is regarded as the index path of the view corresponding to the target node.

Depending on the level of the array to which the array element corresponding to the node belongs, the different nodes have different hierarchies in the multi-fork tree. For convenience of description, it is specified that the array elements in the highest-level array correspond to the first hierarchical node, and the array elements in the next highest-level array correspond to the second hierarchical node, and so recursive. During the multi-fork tree building process, the server numbers each node of the multi-tree so that the view corresponding to each node has a view index. In particular, the server separately numbers the views corresponding to nodes of different hierarchies in the multi-fork tree, separately numbers the different view types corresponding to nodes of the same hierarchy, continuously numbers the identical type views corresponding to the nodes of the same hierarchy, and regards the numbers as view indexes of the corresponding views. The server can record the view index as a subscript of the view name of the corresponding view. For example, as shown in FIG. 3, the view indexes corresponding to the first hierarchical node UIwindow and the second hierarchical node UIwiew may be initial numbers, respectively. The initial number can be 0. The UIButton and UILabel of different types of the fourth hierarchical nodes are separately numbered, and the view indexes corresponding to the three same button type views may be UIButton 0, UIButton 1 and UIButton 2, and the view indexes corresponding to the two same label type views may be UILabel 0 and UILabel 1.

When a view is added or deleted from the current page of the application, the server renumbers only the views of the same type as the newly added or deleted views. For example, when the button control Mutton 1 is deleted, only UIButton 2 is changed to UIButton 1 and the three tab controls are not affected. Different types of views at the same hierarchy are separately numbered to minimize the impact of new or deleted views on the view index. It has a certain anti-interference effect on the index path.

The server queries a corresponding node in the multi-fork tree according to the view identifier of the touchable view, and marking the node as a target node. The server uses the first preset identifier to sequentially join the view names respectively corresponding to a plurality of nodes from the root node to the target node in the multi-fork tree to obtain a directory string, and regards the directory string as the view path of the view corresponding to the target node. The server uses the second preset identifier to sequentially join the view names respectively corresponding to a plurality of nodes from the root node to the target node in the multi-fork tree to obtain an index string, and regards the index string as the index path of the view corresponding to the target node. The first preset identifier and the second preset identifier may be "/", "_", "#", "@" or "*", etc., respectively.

The view names composing the view path correspond to views of different hierarchies, so the view path can distinguish the views of different hierarchies. For example, if the view path corresponding to the control UIButton 1 in the above example is /UIwindow/ViewController/UIView/UIButton, then the UIwindow is the highest-hierarchical view, the ViewController is the next hierarchy view of the UIwindow, and the UIView is the next hierarchy view of the ViewController, and the UIButton is the next hierarchy view of the UIView.

The plurality of views can be inherited from the same view, that is, the upper hierarchy view to which the plurality of views corresponding to can be the same view, such as the control UIButton 0, the control UIButton 1 and the control UIButton 2 can be inherited from the same control UIView. The index path can reflect the display hierarchy relationship of a view in the corresponding upper hierarchical view, that is, different views of the same hierarchy can be distinguished. For example, suppose the index path corresponding to the control UIButton 1 in the above example is 0_1_2_1, indicating that the UIwindow is the highest-hierarchical view, the view controller ViewController is the second child view of the upper hierarchy view UIwindow, and the control UIView is the third child view of the upper hierarchy view ViewController, and the control UIButton is the second child view of the upper hierarchy view UIView.

In this embodiment, the view path can distinguish views of different hierarchies, and the index path can distinguish different views of the same hierarchy, so that the combination of the view path and the index path can jointly complete the unique positioning of the control, so that the burial point frame can be accurately added to the page screenshot.

In an embodiment, the attribute information includes a control name, a basic attribute, and an access attribute; and the step of generating hierarchical paths corresponding to the plurality of views according to the multi-fork tree includes: according to the basic attribute, whether the control is a touchable control is identified; when the control is not a touchable control, it is recognized whether the control name is a collection element in the target collection and whether the access attribute has a preset attribute value; when the control name is a collection element in the target collection, and the access attribute has a preset attribute value, the control is marked as a touchable control; hierarchical paths corresponding to each of the plurality of touchable controls is generated according to the multi-fork tree.

When the application is a native APP, the attribute information transmitted by the first terminal to the server includes the control name and the basic attribute. Basic attributes include transparent attributes, hidden attributes, and interactive attributes and so on. The interactive attributes include the userInteractionEnabled (an attribute name) attribute. The SDK also takes a page screenshot of the application's current page, transmits the page screenshot and the attribute information of a plurality of controls to the server.

A preset collection is stored on the server. The control names of the plurality of controls that can be touched, such as UIControl, UITableViewCell, UICollectionViewCell, UIView, as well as the control names of the corresponding subclass controls, are recorded in the preset collection. Touch operations include tapping, long press, short press or swipe etc. The server identifies whether the control name of the control is a collection element in the preset collection. When it is not, it means that the control cannot be touched. When it is, the server obtains the respective attribute values of the transparent attribute, the hidden attribute and the interactive attribute of the control, and identifies whether the three attribute values respectively reached the respective preset attribute values. When all the three attribute values are respectively the corresponding preset attribute values, it indicates that the control is visible and opaque and can interact with the user, that is, can respond to the user's touch operation, then the server marks the control as a touchable control.

Cross-platform pages present in Web APP or hybrid APP, such as H5 (HTML5, Hypertext Markup Language) pages. The control names of controls in cross-platform pages are not collection elements in the preset collection. When the control is identified as non-touchable control according to the basic attributes, the server identifies whether the control name of the control is a collection element in the target collection. The target collection records the control names of a plurality of controls that can be touched, such as the control name of the RCTView (a control name) and its child class controls. When it is not, it means that the control cannot be touched. When the application is a Web APP or a hybrid APP, the attribute information obtained by the first terminal using the SDK further includes an access attribute. The access attribute includes the isAccessibilityElement (an attribute name) attribute. When it is a collection element in the target collection, the server obtains the attribute value of the access attribute, and determines whether the attribute value is a preset attribute value. When the control name is a collection element in the target collection and the access attribute has a preset attribute value, the server marks the control as a touchable control. The server generates a hierarchical path of the touchable control in accordance to the foregoing manner, adds a corresponding burial point frame to the touchable control according to the hierarchical paths, and transmits a page screenshot to which the burial point frame is added to the second terminal.

In this embodiment, when the application is a native APP, the touchable control can be identified according to the basic attribute; when the application is a Web APP or a hybrid APP, the touchable control can be further identified according to the access attribute, so that the touchable control recognition method is universal for many types of applications, and the recognition accuracy of the touch control can be improved. It is only necessary to generate a hierarchical path of the touchable control according to the multi-fork tree, rather than the hierarchical path of all the views, which can reduce the server resource occupation.

In an embodiment, adding a corresponding burial point frame to the respective view in the page screenshot according to the hierarchical paths includes: the multi-fork tree is traversed, the plurality of nodes in the multi-fork tree are sequentially numbered, and the number is used as the corresponding coincidence index of the view corresponding to the respective node; the corresponding burial point frame is added to the respective view in the page screenshot according to the hierarchical paths; when the burial point frames corresponding to the plurality of touchable views coincides, the coinciding index corresponding to the respective view is obtained, the positions of the burial point frames are adjusted according to the coinciding index corresponding to the respective view.

When two adjacent hierarchies of views can both respond to touch operations or pop-ups, there may be a case that a plurality of views are occluded. As shown in FIG. 4, the three views of the "message" "contact" and "dynamic" will occlude the view corresponding to "Chat Friend 7". The server adds a corresponding burial point frame to the touchable view according to the hierarchical paths. When a plurality of views are occluded, the burial point frames of the plurality of views may also cross or coincide. In order to address the problem of burial point frame crossing or coinciding, the server assigns a corresponding coinciding index to each view of the current page of the application. In particular, the server traverses the multi-fork tree, sequentially numbers the plurality of nodes in the multi-fork tree, and regards the numbers as a coinciding index of the view corresponding to the respective node. According to the traversal order, the number gradually increases or decreases, so that the server can distinguish different nodes according to the number. Hierarchical sequence traversal refers to layer-by-layer traversing of nodes of different hierarchies in a multi-fork tree from high-hierarchy to low-hierarchy, and sequentially traversing a plurality of nodes in the same hierarchy.

When the burial point frames of the plurality of views coincide, the server obtains the coinciding index corresponding to the view, and displays the burial point frame corresponding to the plurality of views according to the coinciding index. It is assumed that, according to the traversal sequence, the coinciding index is gradually increased, and the server displays the burial point frame corresponding to the view with a large coinciding index on the burial point frame corresponding to the view with a small coinciding index. Alternatively, the server briefly displays the portion-crossing or coinciding with the burial point frame corresponding to the view with the large coincided index-of the burial point frame corresponding to the view with the small coincide index. For example, as shown in FIG. 4, the portion-coinciding with the three views of "Message", "Contact" and "Dynamic"-of the burial point frame corresponding to the "Chat Friend 7" view is briefly displayed.

In this embodiment, based on the accurate positioning of the burial point frame according to the hierarchical path, further by assign the corresponding coincide index to each view of the current page of the application, the display hierarchy of the burial point frame is accurately positioned, the problem that the burial point frames cross or coincide is avoided, so that the display effect of the current page of the application can be further improved.

Figure 5:
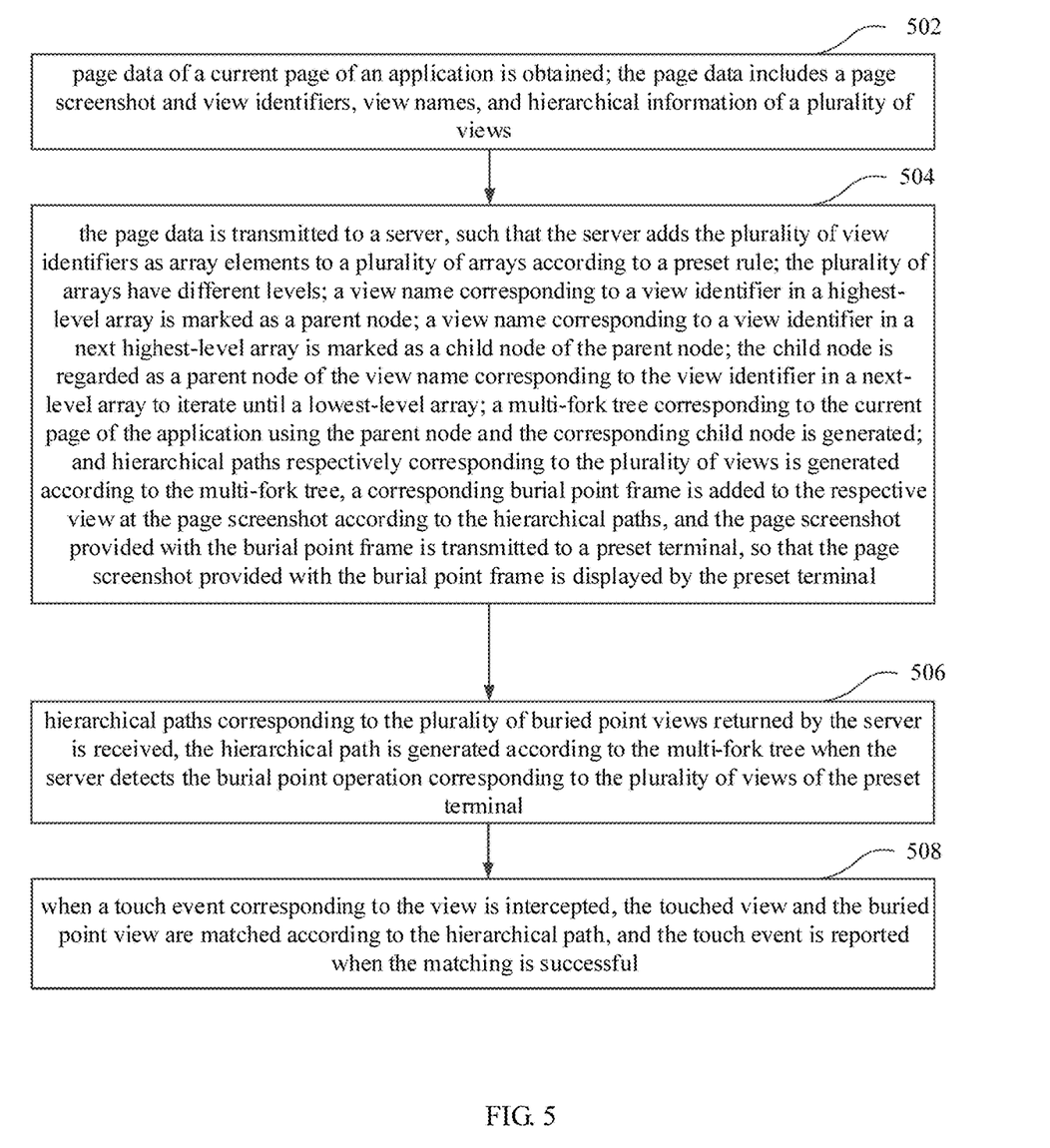
FIG. 5 is a flowchart of a method of page displaying according to another embodiment.

In one embodiment, as shown in FIG. 5, a method of page displaying is provided, the method is described as being applied in, as an example, a third terminal, which particularly includes the following steps:

In step 502: page data of a current page of an application is obtained; the page data includes a page screenshot and view identifiers, view names, and hierarchical information of a plurality of views.

In step 504: the page data is transmitted to a server, such that the server adds the plurality of view identifiers as array elements to a plurality of arrays according to a preset rule; the plurality of arrays have different levels; a view name corresponding to a view identifier in a highest-level array is marked as a parent node; a view name corresponding to a view identifier in a next highest-level array is marked as a child node of the parent node; the child node is regarded as a parent node of the view name corresponding to the view identifier in a next-level array to iterate until a lowest-level array; a multi-fork tree corresponding to the current page of the application using the parent node and the corresponding child node is generated; and hierarchical paths respectively corresponding to the plurality of views is generated according to the multi-fork tree, a corresponding burial point frame is added to the respective view at the page screenshot according to the hierarchical paths, and the page screenshot provided with the burial point frame is transmitted to a preset terminal, so that the page screenshot provided with the burial point frame is displayed by the preset terminal.

In step 506: hierarchical paths corresponding to the plurality of buried point views returned by the server is received, the hierarchical path is generated according to the multi-fork tree when the server detects the burial point operation corresponding to the plurality of views of the preset terminal.

In step 508: when a touch event corresponding to the view is intercepted, the touched view and the buried point view are matched according to the hierarchical path, and the touch event is reported when the matching is successful.

The server builds a multi-fork tree corresponding to the current page of the application according to the page data of the current page of the application reported by the first terminal, and identifies the touchable view according to the attribute information of the plurality of views of the current page of the application, and generates hierarchical paths corresponding to a plurality of touchable view according to that multi-tree, and adds corresponding burial point frame to the plurality of touchable views in the screenshot according to the hierarchical paths. The server transmits a page screenshot provided with the burial point frame to the second terminal. The second terminal displays a page screenshot provided with the burial point frame. The application developer can implement the burial point setting by clicking on the second terminal the burial point frame on the page screenshot and inputting the corresponding touch event identifier. When the second terminal obtained the click operation corresponding to the burial point frame, the burial point information of the view of the buried point (hereinafter "buried point view") is obtained, and the burial point information of the buried point view is transmitted to the server. The buried point view includes a buried point control. The server generates a hierarchical path for each buried point control based on the multi-fork tree. The hierarchical path include view paths and index paths. When the user performs a touch operation on a certain control of the current page of the application through the third terminal, the third terminal intercepts the touch event corresponding to the touched view (hereinafter referred to as "the touched view") using the SDK, and obtains the view path and the index path of the touched view, and matches the view path and the index path of the touched view with the view path and the index path of the buried point view, respectively. When the view path and the index path of the touched view and the buried point view match successfully, respectively, it is identified that the touched view belongs to the buried point view, and the third terminal reports the touch event corresponding to the touched view to the server using the SDK.

In that embodiment, accord to the multi-tree corresponding to the current page of the application, the hierarchical structure of the plurality of view of the current page can be reflected as a whole, so that each view can be accurately positioned according to the hierarchical path of the view generate by the multi-fork tree, so that the embedded point border can be accurately added in the page screenshot; the burial point can be set to the application by clicking the burial point frame, and the terminal can accurately report the touch event of the touched control according to the hierarchical path of the buried point control.

In one embodiment, the step that page data of the page of the application is obtained includes a screenshot request transmitted by the server is received; the screenshot request carries the screenshot identifier corresponding to the screenshot transmitted to the server last time; a screenshot on the current page of the application is performed to obtain a current screenshot of the page, and a screenshot identifier corresponding to the current screenshot of the page is obtained; the page data is transmitted to the server, which includes that the screenshot identifier of the last page screenshot is compared with the screenshot identifier of the current page screenshot; when the screenshot identifier of the last page screenshot is inconsistent with the screenshot identifier of the current page screenshot, the current screenshot and the corresponding screenshot identifier are transmitted to the server.

When the first terminal transmits a visual burial point request to the server to actively trigger the setting of the burial point, or when the server detects that the page screenshot displayed by the second terminal is closed, the server transmits a screenshot request to the first terminal to prompt the first terminal that the next data transfer is possible. The screenshot request carries the screenshot identifier corresponding to the screenshot of the page that the first terminal last transmitted to the server. The screenshot identifier may be an md5 value (Message-Digest Algorithm 5) and the like. The first terminal uses the SDK to take a screenshot of the current page of the application, and obtains a screenshot of the current page of the application and a corresponding screenshot identifier. SDK compares whether the screenshot identifier carried by the screenshot request is consistent with the screenshot identifier of the current page. When the screenshot identifiers are inconsistent, the page screenshot of the current page and the attribute information of the corresponding plurality of views are transmitted to the server; otherwise, the repeated screenshot prompt is returned to the server, and the page data of the current page is no longer transmitted to the server. In this embodiment, only when the screenshot identifier carried in the screenshot request is inconsistent with the screenshot identifier of the current page, the page data is uploaded, which can reduce unnecessary repeated data transmission, thereby reducing the occupation of network resources.

In an embodiment, the hierarchical path includes a view path and an index path; the step of matching the touched view and the buried point view according to the hierarchical path, and reporting the touch event when the matching is successful, including: the view path and index path of the touched view are obtained; view paths and index paths of plurality of buried point views transmitted by the server are obtained; the view path of the touched view is matched with the view path of the buried point view, and the index path of the touched view and the index path of the buried point view are matched; when the view paths and the index paths of the touched view and the buried point view are matched successfully, respectively, the touch event corresponding to the touched view is reported to the server.

The third terminal queries the response function corresponding to the preset class view in the installation file corresponding to the application according to the preset rule. The default rule can be to utilize a system approach such as runtime (a system approach). The installation file may be an iPA file (iPhoneApplication, Apple application file), an APK file (Android Package, an Android application file), etc., and includes response functions corresponding to plurality of views. The preset class view includes a UIControl (a view name), a UITableView, a UICollectionView, a UIView, and a corresponding subclass view. The third terminal inserts a pre-written touch event interception function in the response function corresponding to the preset class view. It should be understood that the response functions corresponding to different preset class views may be different, and the insertion positions of the corresponding touch event interception functions may also be different. The touch event interception function is a method function in the touch event interception script of the SDK, so that the touch event can be intercepted by the SDK.

The third terminal uses the SDK to cache the view path and the index path of the buried point view transmitted by the server. When the user performs a touch operation on a control of the current page of the application through the third terminal, the third terminal intercepts the touch event corresponding to the touched view using the SDK, and reads the attribute information of the plurality of views of the current page of the cached application. The views include controls and view controllers. In the current page of the application, the view controller is used to create and manage controls and is invisible to the user, but is required in building the hierarchy structure. The attribute information includes view name, view index, and hierarchical information. The view index may be pre-assigned to plurality of views by the SDK according to the hierarchical relationship among plurality of views on the current page of the application. According to the hierarchical relationship, the SDK separately numbers the views of different hierarchies, separately numbers the views of different types of the same level, continuously numbers the views of the same type of the same hierarchy, and regards the numbers as the view indexes corresponding to the corresponding views.

The SDK generates a view path and an index path corresponding to the touched view according to the attribute information. Specifically, the SDK backtracks up hierarchy by hierarchy according to the hierarchical information of the touched view, that is, identifies whether there is a upper hierarchical view for the touched view. When there is a upper hierarchical view, the view name and view index of the upper hierarchical view are extracted. The SDK continues to backtrack up hierarchy by hierarchy according to the hierarchical information of the touched view, that is, identifies whether there is a upper hierarchy view corresponding to the upper hierarchical view of the touched view, and if so, extracts the corresponding view name and view index until the highest-hierarchical view.

According to the hierarchical information of the touched view, the SDK uses the first preset identifier to join the extracted plurality of view names hierarchy by hierarchy, that is, sequentially joining the view names of the plurality of views from the highest-hierarchical view to the touched view to obtain a directory string, and regards the directory string as the view path corresponding to the touched view. The SDK uses the second preset identifier to join the extracted plurality of view names hierarchy by hierarchy, that is, sequentially joining the view names of the plurality of views from the highest-hierarchical view to the touched view to obtain an index string, and regards the index string as the hierarchical path corresponding to the touched view. The first preset identifier and the second preset identifier may be "/", "_", "#", "@" or "*", etc., respectively.

The view names composing the view path correspond to views of different hierarchies, so the view path can distinguish the views of different hierarchies. For example, if the view path corresponding to the control UIButton 1 in the foregoing example is /UIwindow/ViewController/UIView/UIButton, then the UIwindow is the highest-hierarchical view, the ViewController is the next hierarchical view of the UIwindow, and so on.

The plurality of views can be inherited from the same view, that is, the upper hierarchy view to which the plurality of views corresponding to can be the same view, such as the control UIButton 0, the control UIButton 1 and the control UIButton 2 can be inherited from the same control UIView. The index path can reflect the display hierarchy relationship of a view in the corresponding upper hierarchical view, that is, different views of the same hierarchy can be distinguished. For example, suppose the index path corresponding to the control UIButton 1 in the above example is 0_1_2_1, which suggests that the UIwindow is the highest-hierarchical view, the view controller ViewController is the second child view of the upper hierarchical view UIwindow, and so on.

The view path can distinguish views of different hierarchies, and the index path can distinguish different views of the same hierarchy, so that the combination of the view path and the index path can jointly complete the unique positioning of the control. It can be understood that the hierarchical path can also be demonstrated with the index path and the index path combined. For example, the view index is used as a subscript of the view name of the corresponding view, and the plurality of subscripted view names are successively joined in the above manner using the first preset identifier or the second preset identifier to obtain the following hierarchical path: UIwindow 0/ViewController 1/UIView 2/UIButton 1.

The SDK matches the view path of the touched view with the view path of the buried point view, and matches the index path of the touched view with the index path of the buried point view. The touch event corresponding to the touched view is reported to the server when the view path of the buried point view matches the view path of the touched view and the index path of the buried point view matches the index path of the touched view. It should be understood that the server that receives the information of the touch event report may be the same as or different from the server that issues the burial point information to the third terminal.

In this embodiment, the view path can distinguish the controls corresponding to different hierarchical views. The index path can distinguish different controls corresponding to the same hierarchical view. The combination of the view path and the index path can accurately locate the control, thereby improving the accuracy of control matching and in turn accurately report the touch events of the control.

Figure 6:
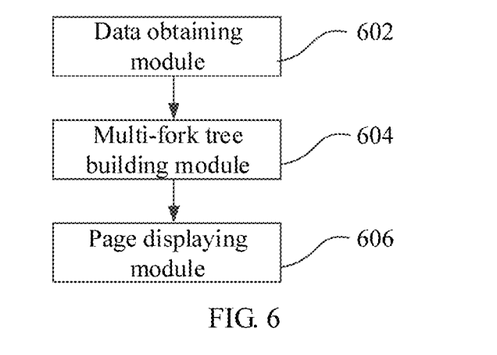
FIG. 6 is a block diagram of an apparatus of page displaying according to an embodiment.

In one embodiment, as shown in FIG. 6, an apparatus of page displaying is provided, including: a data obtaining module 602, a multi-fork tree building module 604, and a page displaying module 606. The data obtaining module is configured to obtain page data of a current page of an application; the page data includes a page screenshot and view identifiers, view names, and hierarchical information of a plurality of views. The multi-fork tree building module 604 is configured to add a plurality of view identifiers to a plurality of arrays according to a preset rule; the plurality of arrays have different levels; query a view name corresponding to a view identifier in the highest-level array, marking the view name corresponding to the view identifier in the highest-level array as a parent node; query a view name corresponding to a view identifier in the next highest-level array, and mark the view name corresponding to the view identifier in the next highest-level array as a child node of the parent node according to the hierarchical information between the plurality of views; regard the child node as a parent node of the view name corresponding to the view identifier in a next-level array to iterate until a lowest-level array; generate a multi-fork tree corresponding to the current page of the application using the parent node and the corresponding child node. The page displaying module configured to generate hierarchical paths respectively corresponding to the plurality of views according to the multi-fork tree, add a corresponding burial point frame to the respective view at the page screenshot according to the hierarchical paths, and transmit the page screenshot provided with the burial point frame to a preset terminal, so that the page screenshot provided with the burial point frame is displayed by the preset terminal.

Figure 7:
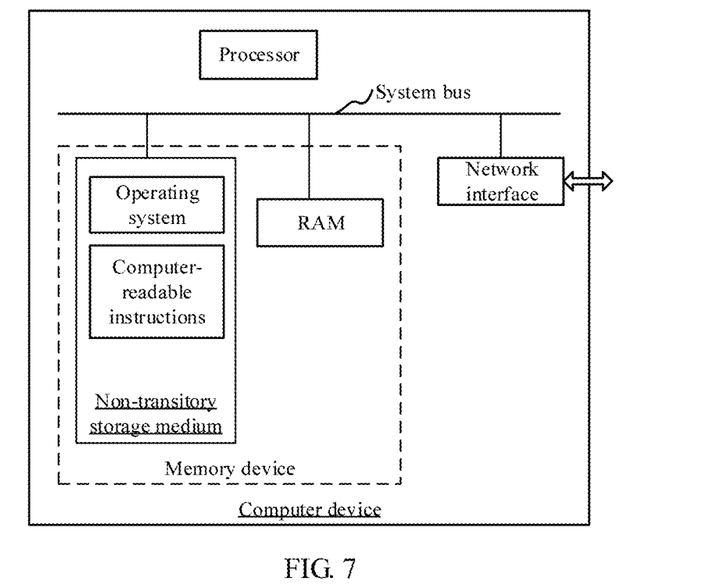
FIG. 7 is a block diagram of a computer device according to an embodiment.

In one embodiment, a computer device is provided, as shown in FIG. 7, the computer device includes a processor, a memory, and a network interface connected through the system bus. The processor of the computer device is configured to provide computation and control capability. The memory of the computer device includes one or more non-transitory storage medium and one or more Random Access Memory (RAM). The non-transitory storage medium of the server has an operating system and computer-readable instructions stored thereon. The RAM of the computer device provides an operation environment for the operating system and the computer-readable instructions in the non-transitory storage medium. The network interface of the computer device is configured to communicate with an external terminal through a network connection, for example, receiving a screenshot of a current page of the application and attribute information of the plurality of views transmitted by the first terminal. The computer-readable instructions are executed by the processor to implement a method of page displaying.

A person skilled in the art should understand that the processes of the methods in the above embodiments can be, in full or in part, implemented by computer programs instructing underlying hardware, the computer-readable instructions can be stored in a non-volatile storage medium, the computer-readable instructions can include the processes in the embodiments of the various methods when it is being executed. The storage medium can be a disk, a CD, a Read-Only Memory (ROM) and so on. The foregoing respective technical features involved in the respective embodiments can be combined arbitrarily, for the purpose of brevity, not all possible combinations of the respective technical features in the foregoing embodiments are described. However, to the extent they have no collision with each other, the combination of the respective technical features shall be considered to be within the scope of the description. The foregoing implementations are merely a number of embodiments of the present disclosure, and are not intended to limit the protection scope of the present disclosure. Any variation or replacement readily figured out by persons skilled in the art within the technical scope disclosed in the present disclosure shall all fall within the protection scope of the present disclosure.

What is claimed is:

1. A method of page displaying comprising:
   obtaining page data of a current page of an application; wherein the page data comprises a page screenshot and view identifiers, view names, and hierarchical information of a plurality of views;
   adding the plurality of view identifiers to a plurality of arrays according to a preset rule; wherein the plurality of arrays have different levels;
   querying a view name corresponding to a view identifier in a highest-level array, and marking the view name corresponding to the view identifier in the highest-level array as a parent node;
   querying a view name corresponding to a view identifier in a next highest-level array, and marking the view name corresponding to the view identifier in the next highest-level array as a child node of the parent node according to the hierarchical information between the plurality of views;
   regarding the child node as a parent node of a view name corresponding to a view identifier in a next-level array to iterate until a lowest-level array;
   generating a multi-fork tree corresponding to the current page of the application using the parent node and the corresponding child node; and
   generating hierarchical paths respectively corresponding to the plurality of views according to the multi-fork tree, adding a corresponding burial point frame to the respective view at the page screenshot according to the hierarchical paths, and transmitting the page screenshot provided with the burial point frame to a preset terminal, so that the page screenshot provided with the burial point frame is displayed by the preset terminal.

2. The method of claim 1, wherein the adding the plurality of view identifiers to the plurality of arrays according to the preset rule comprises:
   extracting the view identifier corresponding to the view whose view name is the same as the view name of a preset root view in the page data, marking the view whose view name is the same as the view name of the preset root view as a parent view, and adding the extracted view identifier to the highest-level array;
   traversing the page data according to the hierarchical information between the plurality of views, extracting the view identifier of a child view corresponding to the parent view in the page data, and adding the view identifier of the child view to the next highest-level array;
   regarding the child view as the parent view, querying whether a corresponding child view exists in the page data;
   when the corresponding child view exists in the page data, adding the view identifier of the corresponding child view to the next-level array, returning to the step of regarding the child view as the parent view, querying whether a corresponding child view exists in the page data; and when the corresponding child view does not exist in the page data, obtaining the lowest-level array.

3. The method according to claim 1, wherein the page data further comprises attribute information of the plurality of views; the view name corresponding to the view identifier in the highest-level array is a root node of the multi-fork tree; the hierarchical path comprises a view path and an index path; the generating the hierarchical paths corresponding to the plurality of views respectively according to the multi-fork tree comprises:

identifying a touchable view in the page screenshot according to the attribute information;

querying a corresponding node in the multi-fork tree according to the view identifier corresponding to the touchable view, and marking the node as a target node;

using the first preset identifier to sequentially join the view names respectively corresponding to a plurality of nodes from the root node to the target node to obtain a directory string, and regarding the directory string as the view path of the view corresponding to the target node;

separately numbering the views corresponding to nodes of different hierarchies in the multi-fork tree, separately numbering the different view types corresponding to nodes of the same hierarchy, and regarding the numbers as view indexes of the corresponding views; and using the second preset identifier to sequentially join the view names respectively corresponding to a plurality of nodes from the root node to the target node to obtain an index string, and regarding the index string as the index path of the view corresponding to the target node.

4. The method according to claim 1, wherein the adding the corresponding burial point frame to the respective view at the page screenshot according to the hierarchical paths comprises:

traversing the multi-fork tree, sequentially numbering the plurality of nodes in the multi-fork tree, and regarding the numbers as a coinciding index of the view corresponding to the respective node;

adding the corresponding burial point frame to the respective view in the page screenshot according to the hierarchical paths; and when the burial point frames corresponding to the plurality of touchable views are coincident with each other, obtaining the coinciding indexes corresponding to the respective views, and adjusting the positions of the burial point frames according to the coinciding indexes.

5. A computer device comprising a processor; and a memory storing computer-readable instructions therein which, when executed by the processor cause the processor to perform steps comprising:

obtaining page data of a current page of an application; wherein the page data comprises a page screenshot and view identifiers, view names, and hierarchical information of a plurality of views;

adding the plurality of view identifiers to a plurality of arrays according to a preset rule; wherein the plurality of arrays have different levels;

querying a view name corresponding to a view identifier in a highest-level array, and marking the view name corresponding to the view identifier in the highest-level array as a parent node;

querying a view name corresponding to a view identifier in a next highest-level array, and marking the view name corresponding to the view identifier in the next highest-level array as a child node of the parent node according to the hierarchical information between the plurality of views;

regarding the child node as a parent node of a view name corresponding to a view identifier in a next-level array to iterate until a lowest-level array;

generating a multi-fork tree corresponding to the current page of the application using the parent node and the corresponding child node; and generating hierarchical paths respectively corresponding to the plurality of views according to the multi-fork tree, adding a corresponding burial point frame to the respective view at the page screenshot according to the hierarchical paths, and transmitting the page screenshot provided with the burial point frame to a preset terminal, so that the page screenshot provided with the burial point frame is displayed by the preset terminal.

6. The computer device according to claim 5, wherein the page data further comprises attribute information of the plurality of views; the view name corresponding to the view identifier in the highest-level array is a root node of the multi-fork tree; the hierarchical path comprises a view path and an index path; the processor is further caused to perform steps comprising:

identifying a touchable view in the page screenshot according to the attribute information;

querying a corresponding node in the multi-fork tree according to the view identifier corresponding to the touchable view, and marking the node as a target node;

using the first preset identifier to sequentially join the view names respectively corresponding to a plurality of nodes from the root node to the target node to obtain a directory string, and regarding the directory string as the view path of the view corresponding to the target node; and separately numbering the views corresponding to nodes of different hierarchies in the multi-fork tree, separately numbering the different view types corresponding to nodes of the same hierarchy, and regarding the numbers as view indexes of the corresponding views; and using the second preset identifier to sequentially join the view names respectively corresponding to a plurality of nodes from the root node to the target node to obtain an index string, and regarding the index string as the index path of the view corresponding to the target node.

7. The computer device according to claim 5, wherein the processor is further caused to perform steps comprising:

traversing the multi-fork tree, sequentially numbering the plurality of nodes in the multi-fork tree, and regarding the numbers as a coinciding index of the view corresponding to the respective node;

adding the corresponding burial point frame to the respective view in the page screenshot according to the hierarchical paths; and when the burial point frames corresponding to the plurality of touchable views are coincident with each other, obtaining the coinciding indexes corresponding to the respective views, and adjusting the positions of the burial point frames according to the coinciding indexes.

8. One or more non-transitory storage medium storing computer-readable instructions thereon that, when executed by one or more processors, cause the one or more processors to perform steps comprising:

obtaining page data of a current page of an application; wherein the page data comprises a page screenshot and view identifiers, view names, and hierarchical information of a plurality of views;

adding the plurality of view identifiers to a plurality of arrays according to a preset rule; wherein the plurality of arrays have different levels;

querying a view name corresponding to a view identifier in a highest-level array, and marking the view name corresponding to the view identifier in the highest-level array as a parent node;

querying a view name corresponding to the view identifier in a next highest-level array, and marking the view name corresponding to the view identifier in the next highest-level array as a child node of the parent node according to the hierarchical information between the plurality of views;

regarding the child node as a parent node of a view name corresponding to a view identifier in a next-level array to iterate until a lowest-level array;

generating a multi-fork tree corresponding to the current page of the application using the parent node and the corresponding child node; and generating hierarchical paths respectively corresponding to the plurality of views according to the multi-fork tree, adding a corresponding burial point frame to the respective view at the page screenshot according to the hierarchical paths, and transmitting the page screenshot provided with the burial point frame to a preset terminal, so that the page screenshot provided with the burial point frame is displayed by the preset terminal.

9. The storage medium according to claim 8, wherein the page data further comprises attribute information of the plurality of views; the view name corresponding to the view identifier in the highest-level array is a root node of the multi-fork tree; the hierarchical path comprises a view path and an index path; the processor is further caused to perform steps comprising:

identifying a touchable view in the page screenshot according to the attribute information;

querying a corresponding node in the multi-fork tree according to the view identifier corresponding to the touchable view, and marking the node as a target node;

using the first preset identifier to sequentially join the view names respectively corresponding to a plurality of nodes from the root node to the target node to obtain a directory string, and regarding the directory string as the view path of the view corresponding to the target node; and separately numbering the views corresponding to nodes of different hierarchies in the multi-fork tree, separately numbering the different view types corresponding to nodes of the same hierarchy, and regarding the numbers as view indexes of the corresponding views; and using the second preset identifier to sequentially join the view names respectively corresponding to a plurality of nodes from the root node to the target node to obtain an index string, and regarding the index string as the index path of the view corresponding to the target node.

10. The storage medium according to claim 8, wherein the processor is further caused to perform steps comprising: traversing the multi-fork tree, sequentially numbering the plurality of nodes in the multi-fork tree, and regarding the numbers as a coinciding index of the view corresponding to the respective node;

adding a corresponding burial point frame to the respective view in the page screenshot according to the hierarchical paths; and when the burial point frames corresponding to the plurality of touchable views are coincident with each other, obtaining the coinciding indexes corresponding to the respective views, and adjusting the positions of the burial point frames according to the coinciding indexes.

* * * * *